United States Patent [19]
Cochran

[11] 3,748,974
[45] July 31, 1973

[54] CAMERA APPARATUS FOR CONTROLLING DIAPHRAGM AND SHUTTER SPEED
[75] Inventor: Todd Dresser Cochran, Churchville, N.Y.
[73] Assignee: Eastman Kodak Company, Rochester, N.Y.
[22] Filed: Sept. 13, 1971
[21] Appl. No.: 180,038

[52] U.S. Cl. ............ 95/10 CE, 95/53 EB, 95/64 D, 352/141
[51] Int. Cl. ........................... G03b 7/08, G03b 9/18
[58] Field of Search .......... 95/10 C, 10 CE, 10 CD, 95/10 CT, 53 R, 53 EA, 53 EB, 64 D; 352/141

[56] References Cited
UNITED STATES PATENTS
| 3,664,245 | 5/1972 | Bresson et al. ............... 95/10 CT X |
| 3,605,588 | 9/1971 | Ort et al. .......................... 95/10 CD |
| 3,580,157 | 5/1971 | Casebeer ...................... 95/10 CD X |
| 3,511,145 | 5/1970 | Ort .................................. 95/10 CD |
| 3,452,656 | 7/1969 | Ruhle et al. ..................... 95/10 CE |

Primary Examiner—Joseph F. Peters, Jr.
Attorney—W. H. J. Kline et al.

[57] ABSTRACT

An exposure control system for use in photographic apparatus which provides automatic adjustment of the exposure aperture and the exposure interval as a function of incident scene illumination. In particular, the exposure control system includes a radiation sensitive assembly disposed to receive scene radiation for controlling the energization of an indicator means such as a lamp and for varying the charge upon a capacitor. The lamp is energized to indicate that there is insufficient illumination to provide proper exposure of the normal exposure interval. If an extended or time exposure is made, the lamp is de-energized to provide an indication of the end of the extended exposure interval. Preferably, first and second trigger circuits are used to energize respectively the indicator lamp and the closing of the associated shutter mechanism. A feedback circuit is provided from the second trigger circuit to the first trigger circuit so that at the termination of the exposure interval, the indicator lamp will be de-energized.

6 Claims, 4 Drawing Figures

CAMERA APPARATUS FOR CONTROLLING DIAPHRAGM AND SHUTTER SPEED

CROSS REFERENCE TO RELATED APPLICATIONS

Reference is made to commonly assigned, co-pending U.S. Application Ser. No. 48,364 now U.S. Pat. No. 3,664,245 filed in the name of Richard J. Bresson and Richard C. Painton and to U.S. Application Ser. No. 48,363 filed June 22, 1970, now abandoned, filed in the name of Richard J. Bresson.

BACKGROUND OF THE INVENTION

This invention relates to exposure control systems for use in photographic apparatus, such as cameras, and more particularly to an exposure control system in which there is provided means for providing an indication of insufficient illumination to provide proper film exposure and also to provide an indication of the termination of an exposure interval.

In the exposure control system described in the above-identified patent to Bresson et al., there is shown a shutter mechanism including a first opening blade for initiating the exposure interval and a second or closing blade which is actuated to terminate the exposure interval, and an exposure control circuit. The exposure control circuit includes an assembly responsive to incident scene radiation for providing a signal indicative thereof, a differential amplifier responsive to this signal to control the size of the exposure aperture, and an integrating circuit to control the length of the exposure interval. In particular, the time integration circuit includes a capacitor which is charged at a rate dependent upon the scene radiation incident upon the radiation sensitive assembly; a first trigger circuit is responsive to the potential stored upon the capacitor to actuate a transducer to release the closing blade thereby terminating the exposure interval. The radiation sensitive assembly is also connected to a second trigger circuit which serves to actuate an indicator means such as a lamp when the scene illumination incident upon the radiaiton sensitive assembly is below a predetermined level thereby indicating that the scene illumination is insufficeint to provide proper film exposure. A switching device such as a transistor is connected between the indicator means and the second trigger circuit to disconnect the indicator means from the second trigger circuit when the first trigger circuit has been actuated to release the closing shutter blade. Thus, the indicator means serves a dual purpose for not only indicating low scene illumination but also for indicating the termination of the exposure interval. Thus, under circumstances of low scene illumination where it would be desirable to take an extended or time exposure, the camera operator is informed when the exposure has been completed. This is particularly desirable where the background noises may obscure the operating sound of the camera indicating that the closing shutter blade has been released.

The photosensitive assembly incorporated into the above-described circuit is more fully described in the above-identified application to Richard J. Bresson. Illustratively, such an assembly may include a photoconductive material having an electrical parameter, i.e., resistance, which varies as a function of incident radiation. More specifically, the resistance presented by such an assembly decreases as the intensity of incident scene illumination increases. It is characteristic of such materials, as well as other photosensitive devices as photodiodes and phototransistors, to exhibit a storage or memory to incident scene illumination. More specifically, the resistivity or other electrical paramater of an element exposed to intense radiation will tend to remain unchanged after the level of radiation has been reduced. As a result, the value of the resistance will tend to remain the same, i.e, low and will no longer accurately reflect the level of incident scene illumination.

In the above-described exposure control system, there is provided a mechanism including a differential amplifier and a suitable motor for causing a diaphragm mechanism to vary the size of the exposure aperture as a function of incident scene illumination. Further, the diaphragm mechanism includes a second variable aperture to vary the scene illumination directed onto the aperture radiation sensitive assembly. Thus, the electrical parameter of the radiation sensitive assembly will vary until a predetermined impedance is obtained at which point the motor driving the diaphragm mechanism is stopped and a proper exposure aperture is achieved. There is a problem when the photo assembly is exposed to a relatively high level of radiation. The radiation sensitive assembly tends to remember the intense radiation and the value of its parameter remains unchanged (i.e., low) as the level of radiation changes. As a result, the diaphragm tends not to respond accurately to open the exposure aperture to provide proper film exposure for the sense level of radiation due to the storage defect of the radiation sensitive assembly.

SUMMARY OF THE INVENTION

It is an object of this invention to provide an indication of when the exposure control system senses radiation insufficient to provide proper film exposure and also an indication of the termination of the exposure interval by the shutter mechanism associated with the exposure control system.

It is a further object of this invention to tend to eliminate the effect of the memory of the radiation sensitive assembly on the operations of the exposure control system.

In accordance with the teachings of this invention, there is provided a radiation sensitive assembly for providing a signal indicative of the inciddnt scene radiation, a diaphragm mechanism operable to vary the scene radiation directed onto the photographic film and onto the radiation sensitive assembly, a diaphragm control circuit responsive to the signal derived from the radiation sensitive assembly for adjusting the diaphragm meechanism, shutter means for initiating and terminating the exposure interval, a time delay circuit for establishing the length of the exposure interval in response to the signal derived from the radiation sensitive assembly, indicator means, and an indicator control circuit responsive to the signal derived from the radiation sensitive assembly for actuating said indicator means when the incident scene illumination is below a predetermined level, the indicator control circuit being coupled to said time delay control circuit by a feedback circuit so that when said time delay circuit terminates the exposure interval, the indicator control circuit serves to actuate the indicator means thereby providing an indication of the termination of the exposure interval.

In an illustrative embodiment of this invention, the time delay circuit and the indicator control circuit may each take the form of a suitable trigger circuit such as "Schmitt Triggers" having input terminals to which an actuating signal is applied to dispose the trigger circuit from a first or non-conducting state to a second or conducting state. In an illustrative embodiment of this invention, the output terminal of the time delay circuit is connected by a suitable feedback path to the input terminal of the indicator control circuit so that when the time delay circuit is disposed in its non-conductive state to thereby terminate the exposure interval, the indicator control circuit is disposed to its non-conductive state thereby de-energizing the indicator means.

In a further illustrative embodiment, the feedback circuit derived from the time delay circuit is connected to the diaphragm control circuit to cause the diaphragm control circuit to close the diaphragm mechanism to its smallest opening so that in the next sequence of operation, the diaphragm mechanism will start at its minimal opening and will move from that minimal opening to the selected opening dependent upon the scene radiation incident upon the radiation sensitive assembly.

BRIEF DESCRIPTION OF THE DRAWINGS

The detailed operation of the preferred embodiment of this invention can be described more completely with reference to the accompanying drawings in which:

FIG. 3 shows an elevated view of the photosensitive assembly incorporated in the exposure control circuit of FIG. 2.

DETAILED DESCRIPTION OF THE INVENTION

An exposure control system according to the present invention includes an adjustable diaphragm mechanism including a member movable to any position along a path for varying an exposure aperture in accordance with the level of scene light, and a shutter mechanism controlled by an electronic time-delay circuit that established the length of an exposure interval. The time-delay circuit preferably is of the integrating type for continuously measuring the total accumulated amount of light energy impinging on a photoresponsive member of the timing circuit. After the diaphragm mechanism has been actuated to adjust the exposure aperture in accordance with the level of scene illumination, the shutter mechanism is then actuated to initiate an exposure interval under the control of the electronic timing circuit that terminates the exposure interval in accordance with the exposure aperture adjustment and in accordance with the amount of illumination actually received during the exposure interval by the photoresponsive member in the timing circuit. The shutter timing circuit can compensate for the exposure aperture setting, for example, by adjustment of an electrical parameter of the timing circuit to vary its time constant, preferably by varying the aperture of the photoresponsive member used in the timing circuit in accordance with the adjustment of the exposure aperture by the diaphragm mechanism.

Figure 1:
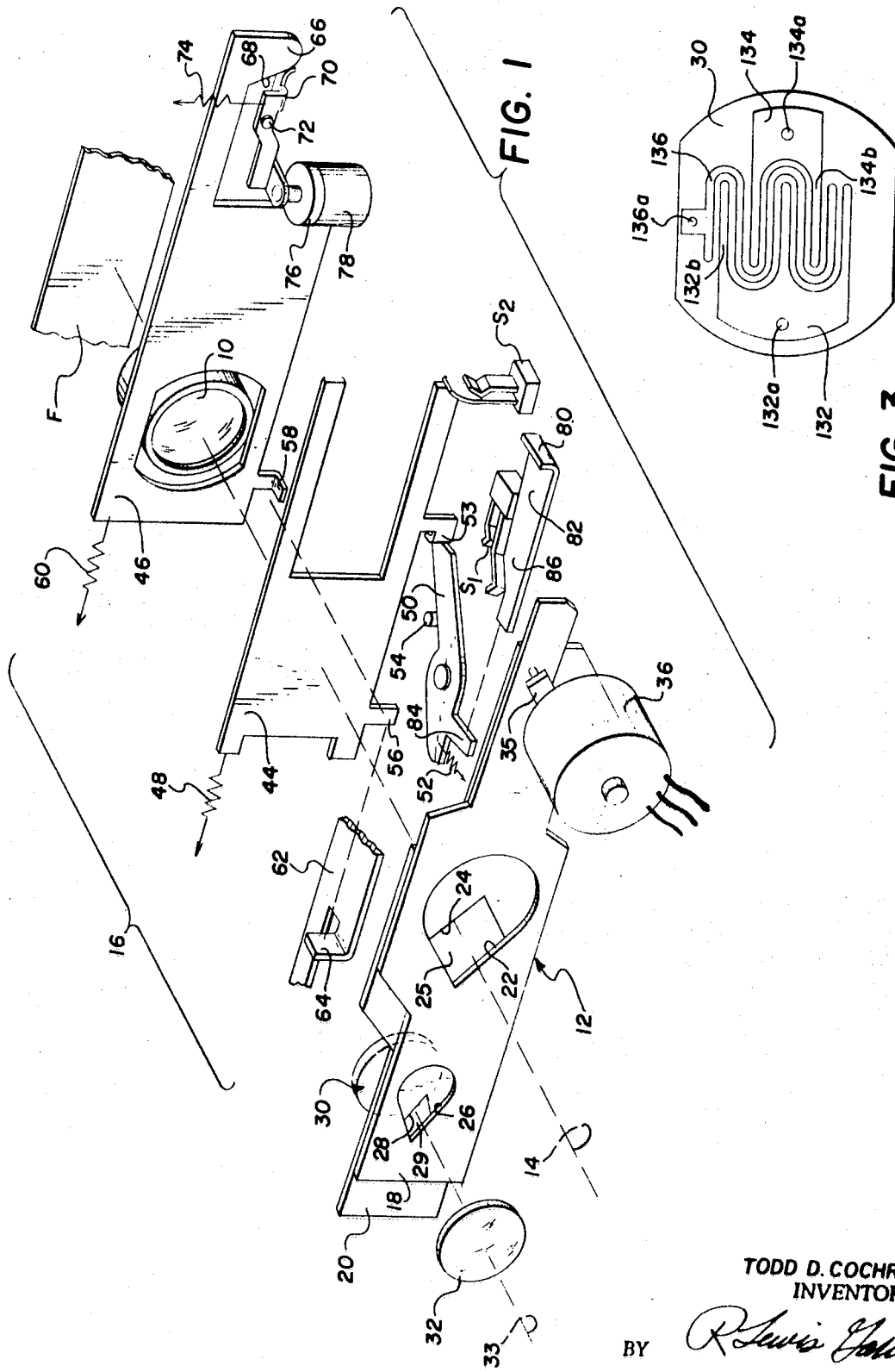
FIG. 1 shows an exploded perspective view of the preferred embodiment of the shutter and diaphragm mechanisms for exposure control apparatus in accordance with the teachings of this invention.

Referring now to the accompanying drawings, FIG. 1 shows an exposure control apparatus according to a preferred embodiment of the invention, including an objective 10 for forming an image on photographic film F, a two-bladed diaphragm mechanism 12 for establishing a variable exposure aperture in alignment with an optical axis 14 of the objective, and a two-bladed shutter mecahnism 16 for initiating and terminating an exposure through the objective.

The diaphragm mechanism 12 includes a pair of blades 18 and 20 that are slidably mounted upon suitable support means (not shown) for equal and opposite movement relative to the lens axis 14. Each of these blades has a tapered aperture 22 and 24, respectively, overlying each other to define an exposure aperture 25 aligned with the optical axis 14. The apertures 22 and 24 are disposed with their tapered portions extending in opposite directions with respect to each other along the line of travel of the two diaphragm blades, such that opposite movement of the blades 18 and 20 will enlarge or diminish the size of the exposure aperture 25. Each of the blades 18 and 20 also has a second tapered aperture 26 and 28, respectively, similar to the tapered aperture 22 and 24, overlying each other to define a second variable aperture 29 overlying a radiation sensitive assembly 30. A lens 32 having an optical axis 33 is positioned to form an image of an object scene on the assembly 3o through the variable aperture 29. Thus, opposite movement of the diaphragm blades 18 and 20 will result in a variation of the size of the aperture 29 over the assembly 30 simultaneously with the variation of the size of the exposure aperture 25. The diaphragm blades 18 and 20 are each connected to opposite ends of an armature 35 rotatably driven by an electromechanical transducer 36, which in this illustrative embodiment is a servo motor. The operation of this servo motor will be described in further detail with respect to the circuit in FIG. 2 below.

The shutter mechanism 16 is a conventional two-blade system, which is shown in FIG. 1 in its cocked position preparatory to actuation to affect an exposure. The shutter mechanism includes a pair of shutter blades 44 and 46 which are slidably mounted upon suitable support means (not shown) for movement relative to the optical axis 14. When the blade 44, which is the "opening" blade in this embodiment, is in its cocked position shown, it is retained against the bias of a spring 48 by a latch member 50 which is biased by a spring 52 into latching engagement with a detent 53, in which position the latch member engages a pin 54. The "opening" blade 44 has a second detent 56 positioned to engage a detent 58 on the blade 46, which in this embodiment is the "closing" blade. Thus, blade 46 is retained in its cocked position against the bias of a spring 60 by the interengagement of the detents 56 and 58. In their respective cocked positions the "opening" blade 44 is retained in a covering relationship with respect to the exposure aperture 25, and the "closing" blade 46 is retained in an uncovering position with respect to the exposure aperture. When the blades are in their respective cocked positions, the spring 48 urges the "opening" blade 44 to an uncovering position with respect to the exposure aperture, and the spring 60 urges the "closing" blade 46 to a covering position over the exposure aperture.

The "closing" blade 46 also includes a second detent 66 having a cam surface 68 adapted to engage a retaining lever 70 pivotally mounted on a pin 72 and biased by a spring 74 in a counterclockwise direction into engagement with the detent 66. The opposite end of lever 70 is connected to an electromagnetic keeper 76 positioned adjacent a pole of an electromagnet 78 when the shutter blade 46 is in its cocked position. The electromagnet 78 is energized and de-energized by an electronic timing circuit discussed in more detail below with respect to FIG. 2. When the electromagnet is energized it holds the lever 70 in its retaining position shown in FIG. 1, to hole the blade 46 in its uncovering position when the detents 56 and 58 become disengaged upon release of the "opening" blade for movement to its uncovering position, thereby initiating an exposure interval. Thereafter, when the electromagnet 78 is de-energized, the bias of spring 60 overpowers the bias of the weaker spring 74 to cause the detent 66 to cam the lever 70 in a clockwise direction, thereby releasing the "closing" blade 46 for movement to a covering position with respect to the exposure aperture and terminate the exposure interval.

For actuation of the shutter mecahnism 16 to effect an exposure, it is provided with a shutter actuation button 80 mounted in an external position on the camera so as to be available to a camera operator. The button 80 is mechanically coupled to a rod or bar 82 that is slidably mounted on mounts (not shown) for movement toward engagement with a detent 84 on shutter latch lever 50, when the shutter actuation button 80 is depressed. Initial movement of the slide bar 82 causes a projection 86 thereon to engage a contact of a normally open switch S1, thereby causing the switch S1 to be closed. Continued movement of the slide bar 82 causes it to engage the detent 84 and rotate the latch 50 in a clockwise direction out of engagement with the detent 53 on the "opening" shutter blade 44, thereby releasing the blade for movement under the influence of spring 48 to an uncovering position with respect to the exposure aperture 25 to thereby initiate an exposure interval. When the "opening" blade 44 moves away from its cocked position, it moves out of engagement with one of the contacts of a normally closed switch S2, thereby causing switch S2 to open.

As shown in FIG. 1, the shutter mecahnism is in its cocked position preparatory to actuation of the shutter mechanism to effect exposure by the operator. When the camera operator depresses the shutter actuation button 80, switch S1 closes energizing the exposure control circuit shown in FIG. 2, then latch 50 is rotated clockwise to release the "opening" blade 44 for movement to its uncovering position with respect to the exposure aperture 25 to thereby initiate an exposure interval and open timing switch S2. When shutter blade 44 moves to its uncovering position, the detent 56 moves out of engagement with the detent 58 on the closing shutter blade 46. However, the electromagnet 78 is energized by the exposure control circuit when the switch S1 is closed, as described below, and latch 70 is held in its retaining position by the electromagnet 78 to prevent the "closing" blade 46 from moving away from its unblocking position. After a period of time determined by the circuit in response to the level of illumination detected by a photosensitive element in the circuit, the electromagnet 78 is de-energized to release the "closing" blade 46 for movement to its blocking position to terminate the exposure interval. Following an exposure, the shutter blades can be returned to their cocked positions by movement of a cocking lever 62 to engage a detent 64 thereon with the detent 56 on the "opening" blade to move the blades back to their cocked position, shown in FIG. 1.

As described above when the shutter actuation button 80 is pressed, switch S1 is closed prior to the release of the opening shutter blade 44. Closure of the switch S1 energizes the circuit, shown in FIG. 2, from a potential source such as a battery 90. When the switch S1 is closed, a circuit is completed between the battery 90 and a trigger circuit 92, which may illustratively take the form of the well known "Schmitt Trigger." Because of the bias potential applied by the battery 90 to the trigger circuit 92, the trigger circuit 92 ie energized from its first or non-conductive state to its second or conductive state. When the trigger circuit 92 is disposed in its conductive state, a current is caused to flow through a coil 94 associated with the electromagnet 78 to thereby retain the closing shutter blade 46 in its initial uncovering position after the opening blade 44 has moved away from its initial position.

Figure 2:
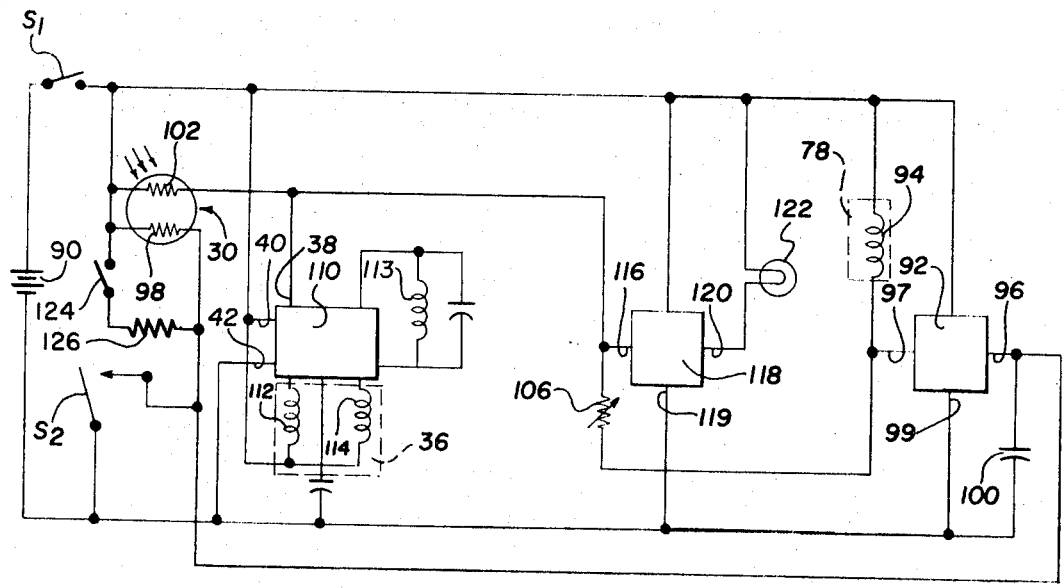
FIG. 2 shows a circuit diagram for controlling the mechanism shown in FIG. 1, including a time delay circuit controlling the exposure interval, a diaphragm control circuit and a control circuit for an indicator means.

The trigger circuit 92 has an input terminal 96 which is connected to the common point between a capacitor 100, and the radiation sensitive assembly 30 and in particular, a radiation sensitive element 98 whose impedance varies as a function of incident scene illumination. As will be explained later, the capacitor 100 and the radiation sensitive element 98 act as an integrating circuit to control the release of the closing shutter blade 46 to terminate the exposure interval. As shown in FIG. 2, the switch S2 serves to short circuit the capacitor 100 until the opening shutter blade 44 is released from its cocked position and to open the normally closed switch S2 to thereby initiate the exposure interval. Thus, as the opening shutter blade 44 is released to permit scene illumination to be directed to the film F, the capacitor 100 is charged at a rate dependent upon the scene illumination directed through the aperture 29 onto the element 98. The potential stored upon the capacitor 100 will increase to a threshold level to cause the circuit 92 to be switched from its second or conductive state to its first or non-conductive state thereby de-energizing the electromagnet 78. As a result, the lever 70 is no longer attracted by the electromagnet 78, and the bias of spring 60 is sufficient to move the closing shutter blade 46 to its covering position with respect to the exposure aperture 25 and to thereby terminate the exposure interval.

The assembly 30 includes a second radiation sensitive element 102 having an impedance which varies as a function of incident scene illumination. As shown in FIG. 2, the radiaiton sensitive element 102 is connected to an input terminal 38 of an aperture control circuit 110. The aperture control circuit 110 may illustratively take the form of a differential amplifier such as disclosed in commonly assigned copending U. S. Application Ser. No. 823,426, now U. S. Pat. No. 3,651,324 issued to Daniel E. Carter, et al. Other examples of control circuits that can be used to control the aperture according to this invention are disclosed in U.S. Pat. No. 3,427,941 issued to L. M. Metzger on Feb. 18, 1969. When switch S1 is closed, battery 90 applies a suitable biasing potential through terminals 40 and 42 to the aperture control circuit 110 to cause the aperture control circuit 110 to energize a pair of drive coils 112 and 114 of the transducer 36 as a function of an input signal applied to the input terminal from the radiation sensitive element 102. In one example of this invention, the aperture control circuit 110 may take the form of a differential amplifier which serves to vary the energizing current through the drive coils 112 and 114 to thereby rotate the armature 35 in one direction or the other dependent upon whether a greater current is directed through drive coils 112 or 114.

As shown in FIG. 1, the transducer 36 drives the armature 35 in either a clockwise or counterclockwise direction to thereby respectively decrease or increase the size of the apertures 25 and 29. As will be explained in detail later, the diaphragm blades 18 and 20 are initially set so that the apertures 25 and 29 are set at thier minimal size to thereby minimize the effects of the memory of the radiation sensitive elements 98 and 102. When switch S1 is closed, the armature 35 of the transducer 36 will normally be rotated by the drive coils 112 and 114 to increase the exposure apertures 25 and 29 dependent upon the level of illumination directed through the aperture 29 onto the radiation sensitive element 102. As the size of aperture 29 increases, more radiation will be directed onto the radiation sensitive element 102 to thereby decrease the resistance or impedance presented by this element. As explained above, when switch S1 is closed, trigger circuit 92 is disposed in its conductive state to thereby complete a circuit from the positive terminal of battery 90 through the radiation sensitive element 102, a variable resistance 106, the terminals 97 and 99 of the trigger circuit 92 to the negative terminal of the battery 90. A voltage divider will be formed by the radiation sensitive element 102 and the variable impedance 106 across the battery 90 to provide a varying signal at the input terminal 38 that is functionally related to the level of scene radiation upon the radiation sensitive element 102. As the resistance of the element 102 decreases, the potential applied to the input terminal increases until the applied potential is equal to a predetermined reference potential of the aperture control circuit 110. At this potential, a null condition is achieved and the circuit 110 applies equal currents through the drive coils 112 and 114 so that substantially euqal, counterbalanced forces are applied to the armature 35. Thus, the diaphragm blades 18 and 20 are driven to set the size of aperture 25 as a function of the scene radiation. In this first mode of operation, the size of the aperture 25 has been adjusted for relatively high levels of scene radiation to provide proper exposure of the film F. The amount of light directed onto the radiation sensitive element 102 has also been adjusted to a substantially fixed quantum dependent upon the intensity of this scene illumination as well as the size of the aperture 29; as a result, the resistance of the element 102 will be adjusted as the size of aperture 29 varies, to a predetermined value related to the potential level at which the exposure aperture control circuit 110 achieves a null condition. Thus, it may be seen that for varying intensities of radiation within a predetermined first range, the diaphragm blades 18 and 20 will be driven to vary the size of the apertures 25 and 29 so that a substantially constant amount of illumination will be directed onto the element 102 and correspondingly, the impedance of the element 102 will be adjusted to a predetermined value. In a similar manner, the resistance presented by the radiation sensitive element 98 at null condition will be adjusted to a substantially constant, predetermined impedance for varying intensities of radiation within the first range.

As shown in FIG. 2, there is provided a feedback coil 113 disposed to sense the flux generated by the drive coils 112 and 114 to provide a feedback signal to the differential amplifier 110 to retard the rate of change at which the drive coils 112 and 114 are driven, in response to changes of the impedance of the radiation sensitive element 102.

In the first mode of operation, the aperture 29 is opened from its minimal setting to an opening at which the size of aperture 25 is adjusted for proper film exposure to thereby minimize the memory effect of the elements 98 and 102. The resistivity of elements 98 and 102 vary as an inverse function of the level of incident radiation; after an initial exposure to a high level of radiation, the elements 98 and 102 may not respond accurately to a decrease in the level of incident radiation and their resistivity may remain relatively low. As a result of this "memory" effect, the radiation sensitive elements 98 and 102 are not able to respond accurately to lower levels of radiation once they have been exposed to high levels of radiation. Thus, to minimize the memory effect, the size of aperture 29 is increased from its minimal opening until a null condition is reached.

In the operation of the shutter mechanism and the diaphragm mechanisms shown in FIG. 1, the shutter actuation button 80 is depressed to first close switch S1 to thereby adjust the size of the apertures 25 and 29 through the operation of the aperture control circuit 110 as explained above. In one illustrative embodiment of this invention, this operation will require approximately 40 micro seconds and will be substantially completed by the time the opening shutter blade 44 is released and the switch S2 is opened to commence the exposure interval and the timing operation. Thus, in the first mode of operation when the exposure interval commences, the impedance of the radiation sensitive element 98 has been adjusted to a substantially predetermined value so that the capacitor 100 will charge to the threshold level of the trigger circuit 92 within a substantially constant period of time. Thus, the exposure intervals for the first mode of operation will be a substantially constant value.

It may be noted however, that the mechanism shown in FIG. 1 and the circuit shown in FIG. 2 will be mass produced, and that variations may occur within the manufacturing tolerances of these devices so that the impedance of the radiation sensitive element 102 may not always be the exact same value, and the apertures 25 and 29 may not be adjusted to the correct exposure openings. Under these conditions, the integrating circuit including element 98 and the capacitance 100 may serve to compensate for this variation by adjusting the exposure interval to a slightly different length of time thereby compensating for any slight error in the size of the aperture 25.

The exposure control apparatus described above is adapted not only to operate in a first range of levels of scene radiation, but also to expose film to scene radiation of relatively lower intensities which would require longer exposure intervals. If the level of scene radiation is low enough, a supplementary light source or an extended exposure interval may be needed which would require firm camera support. The circuitry shown in FIG. 2 includes a suitable indicator means such as an indicator lamp 122 which operates, when the shutter actuation button 80 is initially pressed to close switch S1 to provide an indication that the scene illumination is too low to provide a normal exposure of the film and that eigher firm camera support or an additional light source must be used. In order to energize the indicator lamp 122, the radiation sensitive element 102 is connected to an input terminal 116 of a trigger circuit 118 which serves to energize the lamp 122. The trigger circuit 118 may illustratively take the form of the well known "Schmitt Trigger" and operates to provide a conductive path between its output terminal 119 and its terminal 120 in response to the application to its input terminal 116 of a potential signal below a predetermined threshold level. When the circuit path between the output terminals 119 and 120 becomes non-conductive, the indicator lamp 122 is de-enerigzed or turned off. As explained above, when switch S1 is closed, the trigger circuit 92 is actuated to provide a conductive path between its terminals 97 and 99 thereby establishing a circuit from the positive terminal of the battery 90 through the radiation sensitive element 102, and the variable impedance 106 to the negative terminal of the battery 90. Thus, if the radiation directed onto the radiation sensitive element 102 is below a predetermined level, the impedance of the element 102 will be sufficient that the voltage applied to the input terminal 116 will fall below the threshold value of the trigger circuit 118 and a conductive path is established between its terminals 119 and 120 to thereby energize the indicator light 122. When indicator light 122 is energized, the operator is informed that there is insufficient illumination to provide a proper exposure without an additional source of radiation such as a flash cube or that a tripod is needed for an extended or time exposure. If the operator chooses, he may place the camera on a tripod and continue to press the shutter actuation button 80 to initiate a time or extended exposure of the film F.

In the second mode of operation, the level of radiation is relatively low compared to the first range so that the impedance presented by the element 102 will be correspondingly higher. As a result, the potential developed at the input terminal 38 of the aperture control circuit 110 will not be sufficient to achieve a null condition and the circuit 110 will continue to energize the drive coils 112 and 114 to drive the blades 18 and 20 to open the apertures 25 and 29 to their maximum settings. The opening of the apertures 25 and 29 will normally occur within a relatively short period of time before switch S2 is opened to thereby initiated the timing process. In a second mode of operation, sufficient film exposure is not achieved at the maximum opening of the aperture 25 and the predetermined exposure interval used in the first mode of operation. In order to achieve proper film exposure, the exposure interval is extended for a period of time to achieve proper exposure with the aperture 25 set at its maximum opening. More specifically, when the switch S2 is opened, the capacitor 100 beings to charge at a rate determined by the impedance of the radiation sensitive element 98, which as explained above is dependent upon the scene radiation directed through the aperture 29 onto the element 98. The capacitor 100 stores the charge until the threshold level of trigger circuit 92 has been reached at which time the trigger circuit 92 is disposed in its first or non-conductive state thereby de-energizing the coil 94 and releasing the closing shutter blade 46 to terminate the exposure interval.

In the second mode of operation, the maximum opening of the aperture 25 is insufficient to provide proper film exposure, and the exposure interval is extended from the relatively fast exposure interval required in the first mode of operation. In one illustrative example, the exposure interval of the first mode of operation is set at approximately one/two-hundredth second. If the exposure interval is extended beyond that period in which the camera may be hand-held, the trigger circuit 118 will be actuated as explained in response to the low level of incident radiation to energize the indicator lamp 122. If an extended or time exposure is used, it would be desirable to provide an indication of the termination of the exposure interval. In accordance with the teachings of this invention, the termination of the exposure interval by the trigger circuit 92 also effects the indicator means so that the indicator lamp 122 is turned off at the end of the exposure interval. More specifically, when the trigger circuit 92 is disposed in its nonconductive state, the conductive circuit between terminals 97 and 99 of the circuit 92 is rendered non-conductive or disconnected to thereby "break" the circuit between the positive terminal of the battery 90 through the element 102 and the variable impedance 106 to the negative terminal of the battery 90. Therefore, the potential applied to the input terminal 116 of the trigger circuit 118 is raised to a potential approaching the positive potential of the battery 90. The trigger circuit 118 detects a condition similar to that when the element 102 is exposed to a high level of scene radiation. As a result, the threshold level of the circuit 118 is exceeded and the circuit 118 is rendered non-conductive to thereby de-energize the indicator lamp 122. Thus in accordance with the teachings of this invention, a feed-back path is provided from the output terminal 97 of the trigger circuit 92 to the input terminal 116 of the trigger circuit 118 to thereby dispose the circuit 118 in its non-conductive mode of operation when the trigger circuit 92 is disposed in its first or non-conductive mode of operation.

Further, a feed-back path is provided from the output terminal 97 of the trigger circuit 92 to the input terminal 38 of the aperture control circuit 110 to thereby cause the aperture control circuit 110 to energize the drive coils 112 and 114 and to drive the diaphragm blades 18 and 20 to set the apertures 25 and 29 at their minimum opening. As explained above, it is desirable to initiate each sequence of the operation of the aperture control apparatus at the minimum opening of the aperture 29 to thereby minimize the problems associated with the storage or memory of the radiation sensitive elements 98 and 102. More specifically, radiation sensitive material such as photoconductive materials, which exhibit a change of resistivity in response to changes of intensity of incident radiation, tend to remember or store high levels of radiation even after that radiation has been removed, i.e., the resistivity ofa photoconductive element will remain relatively low. However, the memory effect of such photoconductive materials tends to be less when exposed to relatively low levels of incident radiation, and elements made up of such materials will tend to vary its resistivity more quickly and more accurately when the level of radiation is increased from 2 relatively low level to a higher level. With regard to FIG. 2, the feed-back path extends from the output terminal 97 of the trigger circuit 92 to the input terminal 38 of the aperture control circuit 110 so that when the trigger circuit 92 is rendered to its first or non-conductive state to thereby terminate the exposure interval, a higher potential approaching that of the positive terminal of the battery 90 is applied to the input terminal 38, to thereby cause the apertures 25 and 29 to assume their minimal openings. As a result, the apertures 25 and 29 may be adjusted in the next sequence of operation, from their minimal opening to an opening determined by scene radiation to thereby reduce the storage effects of the elements 98 and 102.

Preferably, the photoconductive cells 98 and 102 are constructed as two independent photoconductive portions of a single structure. An example of such a structure is shown in FIG. 3 in which the photocell includes a layer of photoconductive material on which is located three discrete electrodes 132, 134 and 136, connected respectively to three terminals 132a, 134a and 136a. The outer electrodes 132 and 134 include strip portions 132b and 134b, respectively, which are interlined with respect to each other in spaced parallel relation. The center electrode 136 comprises a single elongated strip that undulates between the strip portions of the outer two electrodes in spaced parallel relation with those electrode strip portions. This structure provides a first photoconductive resistance between the terminals 136a and 132a, and a second photoconductive resistance between the terminals 136a and 134a. The photoconductive areas of each of these two discrete photocells are thus defined as two side-by-side undulating paths defining a plurality of alternate strips of photoconductive material in interlined, spaced, parallel relation. This multiple photocell unit provides a single, structure for detecting illumination over the entire field of a scene with two photoconductive output signals.

Figure 4:
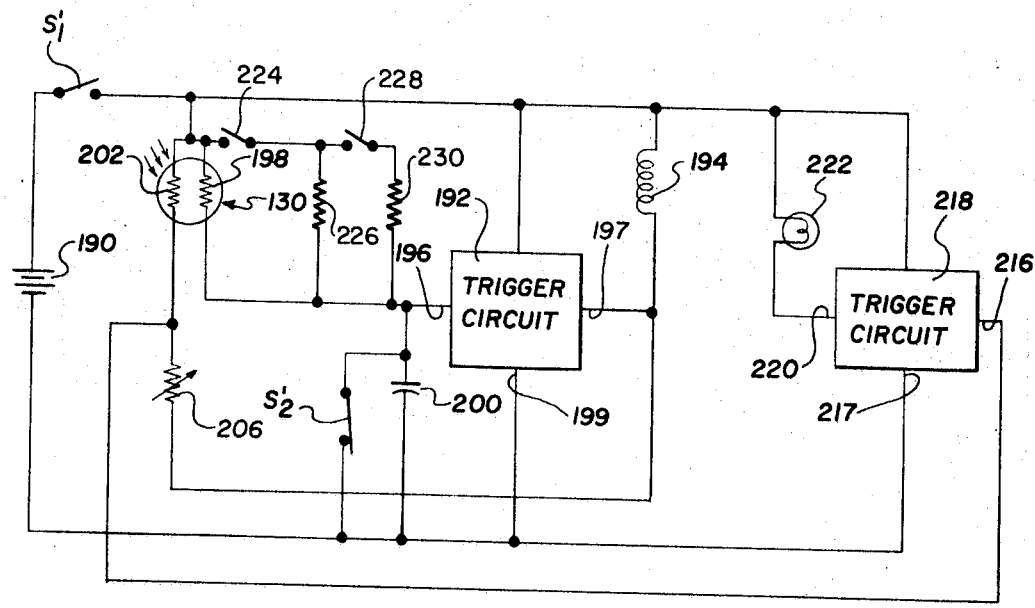
FIG. 4 shows a further embodiment of a circuit diagram for controlling the operation of a shutter mechanism similar to that shown in FIG. 1.

Referring now to FIG. 4, there is shown a circuit for controlling a shutter mechanism similar to that shown in FIG. 1. More specifically, the circuit of FIG. 4 operates to control the movement of the opening and closing shutter blades 44 and 46 without the need of the diaphragm blades 18 and 20 and the servo motor 36 for varying the size of the apertures 25 and 29. In a manner similar to that described above, a switch S1' is closed upon actuation of the shutter button 80 to connect a battery 190 in circuit with a trigger circuit 192, which serves as will be explained to energize a coil 194 associated with the electro magnet 78. Upon application of the potential, the trigger circuit 192 is immediately disposed from its first or non-conductive state to its second or conductive state to thereby establish a conductive path between its terminals 197 and 199 to thereby connect the coil 194 in circuit with the battery 190. As a result, the electro magnet 78 attracts the level 70 to retain the closing shutter blade 46 in its open position once the opening shutter blade 44 has been released. If the illumination directed onto a radiation sensitive assembly 130 is insufficient to properly expose the photographic film F, an indicator lamp 222 will be energized to provide an indication thereof. More specifically, the assembly 130 includs first and second radiation sensitive elements 198 and 202 which are responsive to the incident scene radiation to vary a parameter, e.g., electrical resistivity, as a function of the incident scene radiation. It is noted that in the embodiment of the camera apparatus to be used with exposure control circuit of FIG. 4, that the exposure aperture 25 and the photocell apertures 29 through which radiation is directed onto the assembly 130 are fixed and cannot be varied as explained and shown with regard to FIG. 1. When the trigger circuit 192 is disposed in its first or conductive state, a circuit is established through radiation sensitive element 202, variable impedance 206 to the negative terminal of the battery 190 so that the impedance 206 and element 202 form a voltage dividing network the junction point of which is connected to an input terminal 216 of a trigger circuit 218. If the resistivity of the radiation sensitive element 202 exceeds a predetermined value, i.e., the incident scene radiation is below a predetermined level, a signal will be applied to the input terminal 216 which will dispose the trigger circuit 218 from its first or non-conductive state to a second or conductive state to thereby provide a conductive path between its terminals 220 and 217 and to energize the indicator lamp 222. The energized lamp 222 indicates that the incident scene illumination is too low to provide a normal exposure without the aid of an additional light source or camera support.

With regard to FIG. 1, as the shutter actuation button 80 is continued to be closed, normally closed switch S2' is opened to thereby disconnect the shortcircuit across capacitor 200, and to initiate the exposure interval. More specifically, a time integration circuit is formed by the capacitor 200 and the radiation sensitive element 198. In a manner similar to that described above, the capacitor 200 charges at a rate determined by resistivity of the element 198, which in turn is a function of the incident scene radiation. When the capacitor 200 has charged to a level corresponding to the threshold level of the trigger circuit 192, the circuit 192 is disposed from its second or conductive state to its first or non-conductive state to thereby de-energize the coil 194 and to release the closing shutter blade 46 thereby terminating the exposure interval. In accordance with the teachings of this invention, a feedback path is provided between the output terminal 197 of the trigger circuit 192 and the input terminal 216 of the trigger circuit 218. As a result, when the trigger circuit 192 is disposed in its first or non-conductive state, the circuit between the input terminal 216 of the trigger circuit 218 through the variable impedance 206 and the negative terminal of the battery 190 is broken and the potential applied to the input terminal 216 approaches that potential of the positive terminal of the battery 190. At this more positive potential, the trigger circuit 218 is disposed in its first or non-conductive state to thereby de-energize the indicator lamp 122. As a result of the feedback path, the indicator lamp 122 is used to not only indicate a low light condition under which sufficient film exposure cannot be achieved without the aid of an additional light source or camera support, but also to indicate the termination of an extended or timed exposure.

When the indicator lamp 122 (or 222) is energized, the operator may choose to use an auxiliary light source such as a flash cube. With reference to the circuit of FIG. 2, the insertion of a flash cube serves to dispose the normally open switch 124 to its closed position to thereby connect a resistor 126 in parallel across the radiation sensitive element 98 and in circuit with capacitor 100. In the flash mode, the primary source of illumination is normally derived from the flash device and the exposure interval must be adjusted primarily as a function of the illumination derived from the flash device. The resistance of the resistor 126 is chosen to determine the exposure interval as a function of light derived from the auxiliary source and is connected in circuit by the switch 124 with the capacitor 100 to control the exposure interval. In a similar fashion, the circuit of FIG. 4 includes a resistor 226 which is connected in circuit with capacitor 200 by a switch 224 when a flash cube is coupled to the camera, to determine the exposure interval for flash operation. In an illustrative embodiment, the camera includes a lens adjustment mechanism which permits the focal length of the lens to be focused for relatively close objects. The setting of the lens adjustment mechanism for short distances closes a normally open switch 228 to thereby connect a resistor 230 in parallel with resistor 226 and in circuit with capacitor 200. The value of resistance 230 is chosen to reduce the composite value of resistance 226 and 230 by an amount sufficient to reduce the exposure intervals taken at the shortened distances.

The invention has been described in detail with particular reference to preferred embodiments thereof, but it will be understood that variations and modifications can be effected within the spirit and scope of the invention.

We claim:

1. In a camera adapted to expose film to scene radiation through an exposure aperture, exposure control apparatus comprising:
    shutter means for uncovering and covering the exposure aperture;
    means for moving said shutter means to uncover and cover the exposure aperture;
    time delay circuit means including photosenstivive means disposed to receive scene radition and having an electrical parameter which varies as a function of the incident scene radiation for producing a control signal an exposure interval after the uncovering of the exposure aperture, the exposure interval being related to said parameter of said photosensitive means;
    first circuit means having an input terminal coupled to said time delay circuit and an output terminal coupled to said shutter means, said first circuit means being disposable in a first state for connecting said shutter means to an energy source to thereby retain said shutter means in a positive uncovering the exposure aperture and being disposable in a second state in response to said control signal for disconnecting said shutter means from said energy souce to thereby permit said shutter means to cover the exposure aperture and terminate the exposure interval;
    indicator means; and
    second circuit means having an input terminal, coupled to said photosensitive means and coupled by a feedback circuit to said output terminal of said first circuit means, and an output terminal connected to said indicator means, said second circuit means being disposable in a first state when said electrical parameter of said photosensitive means is above a predetermined level for energizing said indicator means to indicate that the scene radiation is below a predetermined level and disposable in a second state when the path through said feedback circuit is interrupted for de-energizing said indicator means to thereby indicate the termination of the exposure interval.

2. In a camera adapted to expose film to scene radiation through an exposure aperture, exposure control apparatus comprising:
    diaphragm means for varying the size of the exposure aperture;
    actuatable shutter means for uncovering and covering the exposure aperture;
    time delay circuit means including photosensitive means disposed to receive scene radiation and having an electrical parameter which varies as a function of incident scene radiation for producing a control signal an exposure interval after the uncovering of the exposure aperture, the exposure interval being related to the scene radiation incident upon said photosensitive means;
    a diaphragm control circuit, coupled to said photosensitive means, for actuating said diaphragm means to vary the size of the exposure aperture coresponding to the level of radiation incident on said photosenstive means;
    first circuit means, coupled with said time delay circuit means and said diaphragm control circuit, and being operable in a first state for retaining said shutter means in a position uncovering the exposure aperture, and being actuatable to a second state by said control signal for permitting said shutter means to cover the exposure aperture thereby terminating the exposure interval and for actuating said diaphragm control circuit to vary said diaphragm means to form a minimal exposure aperture;
    indicator means; and
    second circuit means, coupled to said photosensitive means and said first circuit means and being disposed in a first state when said first circuit means is disposed in its first state and the scene illumination is below a predetermined value, for actuating said indicator means to indicate that scene illumination is insufficient to exposure the film, said second circuit means being disposed in its second state for deactuating said indicator means to thereby indicate the termination of the exposure interval.

3. In a camera adapted to expose film to scene radiation through an exposure aperture, exposure control apparatus comprising:
    photosensitive means disposed to receive scene illumination for providing an electrical signal corresponding to the level of scene radiation incident thereon;
    diaphragm means for varying the size of the exposure aperture;
    diaphragm control circuit means coupled to said photosensitive means for actuating said diaphragm means to vary the size of the exposure aperture as a function of scene radiation incident upon said photosensitive means;
    means for actuating said diaphragm control circuit to adjust the exposure aperture;
    actuatable shutter means for covering and uncovering the exposure aperture;
    actuatable time delay means coupled to said photosensitive means for producing a control signal an exposure interval after the actuation of said time delay circuit means, said time delay circuit means including means for establishing the exposure interval as a function of the level of scene radiation incident upon said photosensitive means;

means for actuating said shutter means to uncover said exposure aperture to initiate an exposure interval after actuation of said diaphragm control circuit means;

means for actuating said time delay circuit in timed relation with the actuation of said shutter means to uncover the exposure aperture; and circuit means, coupled with said time delay means and said diaphragm control circuit and responsive to said control signal for actuating said shutter means to cover said aperture to thereby terminate the exposure interval and for actuating said diaphragm control circuit to adjust the exposure aperture to its minimal opening.

4. The exposure control apparatus as claimed in claim 3, wherein said photosensitive means comprises two photosensitive elements constructed in a single unit.

5. In a camera adapted to exposure film to scene radiation through an exposure aperture, an exposure control apparatus comprising:

photosensitive means responsive to incident scene illumination for providing a signal dependent upon the level of scene radiation incident thereon:

diaphragm means for varying the size of the exposure aperture;

diaphragm control circuit means responsive to the electrical signal of said photosensitive means or actuating said diaphragm means to vary the size of the exposure aperture;

actuatable shutter means for uncovering and covering the exposure aperture; and time delay circuit means responsive to the signal of the photosensitive means for actuating said shutter means an exposure interval after the uncovering of the exposure aperture to effect the covering of the exposure aperture, the exposure interval being dependent upon the scene radiation incident upon said photosensitive means;

said diaphragm control circuit means responsive to the covering of the exposure aperture by said shutter means to cause said diaphragm means to vary the size of the exposure aperture to its minimum setting.

6. In a camera adapted to expose film to scene radiation through an exposure aperture, exposure control apparatus comprising:

first and second radiation sensitive elements disposed to receive scene radiation and each having an electrical parameter which varies as a function of the incident scene radiation;

diaphragm mans for varying the sizes of the exposure aperture and for varying the size of a second aperture disposed to direct scene radiation onto said first and second photosensitive elements;

diaphragm means for varying the sizes of the exposure aperture and for varying the size of a second aperture disposed to direct scene radiation onto said first and second photosensitive elements;

a diaphragm control circuit, coupled to said first radiation sensitive element and responsive to the value of its electrical parameter, for actuating said diaphragm means to vary the size of the exposure aperture and said second aperture in relation to the level of radiation incident upon said first radiation sensitive element;

actuatable shutter means for uncovering and covering the exposure aperture;

means for moving said shutter means to uncover and cover the exposure aperture;

storage circuit means, coupled to said second radiation sensitive element, said storage circuit means and said second radiation sensitive element being coupled for producing a control signal an exposure interval after the uncovering of the exposure aperture;

first circuit means having an input terminal coupled to said storage circuit means and an output terminal coupled to said shutter means, said first circuit means being operable in a first state for connecting said shutter means to an energy source to thereby retain said shutter means in an exposure aperture uncovering position and being disposable to a second state in response to said control signal for disconnecting said shutter means from said energy source to thereby permit said shutter means to cover the exposure aperture and terminate the exposure interval;

indicator means; and second circuit means, having an input terminal coupled to said first radiation sensitive element and to said output terminal of said first circuit means by a feedback circuit and an output terminal connected to said indicator means, for providing an output for energizing said indicator means when said electrical parameter of said first radiation sensitive element is above a predetermined level, and for de-energizing said indicator means to thereby indicate the termination of the exposure interval when said output from said first circuit means via said feedback is terminated.

* * * * *